(12) United States Patent
Suzuki et al.

(10) Patent No.: US 11,454,761 B2
(45) Date of Patent: Sep. 27, 2022

(54) FUSION CONNECTION DEVICE, WIRELESS INFORMATION TERMINAL, FUSION CONNECTION SYSTEM, AND FUSION CONNECTION METHOD

(71) Applicant: SEI OPTIFRONTIER CO., LTD., Yokohama (JP)

(72) Inventors: Takahiro Suzuki, Yokohama (JP); Kazuyoshi Ooki, Yokohama (JP); Hideaki Yusa, Yokohama (JP)

(73) Assignee: SEI OPTIFRONTIER CO., LTD., Yokohama (JP)

( * ) Notice: Subject to any disclaimer, the term of this patent is extended or adjusted under 35 U.S.C. 154(b) by 0 days.

(21) Appl. No.: 16/754,286

(22) PCT Filed: Dec. 13, 2018

(86) PCT No.: PCT/JP2018/045922
§ 371 (c)(1),
(2) Date: Apr. 7, 2020

(87) PCT Pub. No.: WO2019/124218
PCT Pub. Date: Jun. 27, 2019

(65) Prior Publication Data
US 2020/0341197 A1    Oct. 29, 2020

(30) Foreign Application Priority Data

Dec. 22, 2017  (JP) .............................. JP2017-246797

(51) Int. Cl.
*G02B 6/255*    (2006.01)
(52) U.S. Cl.
CPC ................................ *G02B 6/2553* (2013.01)

(58) Field of Classification Search
CPC .............................. G02B 6/2553; G02B 6/255
See application file for complete search history.

(56) References Cited

U.S. PATENT DOCUMENTS 5,386,490 A * 1/1995 Pan ...................... G02B 6/2835
385/134
5,570,446 A * 10/1996 Zheng .................. G02B 6/2551
219/121.45

(Continued)

FOREIGN PATENT DOCUMENTS

| CN | 103926652 A | 7/2014 |
| CN | 103926653 A | 7/2014 |

(Continued)

OTHER PUBLICATIONS

Reference number list for U.S. Patent Application Publication No. 2005/0238298 of Roark et al. (Roark,) (Year: 2021).*

(Continued)

*Primary Examiner* — Andrew Jordan
(74) *Attorney, Agent, or Firm* — Oliff PLC

(57) ABSTRACT

A fusion splicer is disclosed. The fusion splicer includes a fusion splicing unit that fusion splices of optical fibers, a communication unit that communicates through wireless connection with an external terminal, and a setting unit that sets a fusion condition of the fusion splicing unit. The communication unit acquires information related to the fusion condition of the fusion splicing unit from the external terminal. The setting unit sets the fusion condition of the fusion splicing unit based on the acquired information related to the fusion condition. The fusion splicing unit fusion splices in accordance with the fusion condition set by the setting unit.

15 Claims, 10 Drawing Sheets

(56) References Cited

U.S. PATENT DOCUMENTS

| | | | | |
|---|---|---|---|---|
| 5,635,940 A * | 6/1997 | Hickman | ......... | H04L 29/12311 342/357.31 |
| 6,206,583 B1 * | 3/2001 | Hishikawa | .......... | G02B 6/2551 385/96 |
| 6,676,307 B1 * | 1/2004 | Yang | .................... | G02B 6/2551 385/95 |
| 6,984,077 B2 * | 1/2006 | Bush | ................... | G02B 6/2551 385/96 |
| 7,004,640 B2 * | 2/2006 | Bush | ................... | G02B 6/2555 385/39 |
| 7,077,579 B2 * | 7/2006 | Bush | ................... | G02B 6/2551 385/96 |
| 7,255,498 B2 * | 8/2007 | Bush | ...................... | G01M 11/37 385/95 |
| 7,690,850 B2 * | 4/2010 | Kossat | ................ | G02B 6/2551 385/95 |
| 8,939,660 B2 * | 1/2015 | Sato | .................... | G02B 6/2555 385/96 |
| 8,950,955 B2 * | 2/2015 | Fukuda | ............... | G02B 6/2558 385/99 |
| 9,897,756 B2 * | 2/2018 | Miyamori | ........... | G02B 6/2555 |
| 9,964,705 B2 * | 5/2018 | Miyamori | ........... | G02B 6/2551 |
| 10,825,309 B2 * | 11/2020 | Ooki | ................ | G08B 13/1427 |
| 10,901,723 B2 * | 1/2021 | Ooki | ........................ | G06F 8/65 |
| 10,989,875 B2 * | 4/2021 | Ooki | ..................... | G02B 6/3616 |
| 2003/0031432 A1 * | 2/2003 | Sykora | .............. | G02B 6/03627 385/96 |
| 2003/0108307 A1 * | 6/2003 | Eskildsen | ........... | G02B 6/2551 385/96 |
| 2004/0190838 A1 * | 9/2004 | Bush | ................... | G02B 6/2555 385/96 |
| 2005/0238298 A1 * | 10/2005 | Roark | ................. | G02B 6/2553 385/96 |
| 2009/0080842 A1 * | 3/2009 | Kossat | ................ | G02B 6/2551 385/97 |
| 2010/0260458 A1 * | 10/2010 | Sato | .................... | G02B 6/2555 385/96 |
| 2013/0230286 A1 * | 9/2013 | Fukuda | ................ | G02B 6/2558 385/96 |
| 2013/0236145 A1 * | 9/2013 | Sato | ..................... | G02B 6/2555 385/96 |
| 2013/0284377 A1 * | 10/2013 | Takayanagi | .......... | G02B 6/2553 156/433 |
| 2016/0116675 A1 * | 4/2016 | Sasaki | ................. | G02B 6/2553 65/485 |
| 2016/0266314 A1 * | 9/2016 | Miyamori | ........... | G02B 6/2551 |
| 2016/0266315 A1 * | 9/2016 | Miyamori | ........... | G02B 6/2553 |
| 2019/0310838 A1 * | 10/2019 | Ooki | ........................ | G06F 8/65 |
| 2020/0134994 A1 * | 4/2020 | Ooki | ................. | G08B 13/2417 |
| 2020/0134997 A1 * | 4/2020 | Ooki | ................. | G08B 13/1427 |
| 2020/0278497 A1 * | 9/2020 | Ooki | .................... | G02B 6/2553 |
| 2020/0341196 A1 * | 10/2020 | Ooki | ..................... | G06Q 10/06 |
| 2020/0341197 A1 * | 10/2020 | Suzuki | ................ | G02B 6/2553 |
| 2020/0371492 A1 * | 11/2020 | Ohnishi | ............... | G05B 19/406 |
| 2021/0012630 A1 * | 1/2021 | Ooki | ....................... | G06F 21/31 |

FOREIGN PATENT DOCUMENTS

| | | |
|---|---|---|
| CN | 103941340 A | 7/2014 |
| CN | 108562974 A | 9/2018 |
| JP | 2003-287643 A | 10/2003 |
| JP | 2006-058474 A | 3/2006 |
| JP | 2009-037244 A | 2/2009 |
| JP | 2012-141357 A | 7/2012 |
| JP | 2017-224076 A | 12/2017 |
| WO | 2017/199942 A1 | 11/2017 |

OTHER PUBLICATIONS

Reference number list for Chinese patent publication No. 103926652 of Luo published Jul. 16, 2014 (Luo,) (Year: 2021).*

Reference number list for U.S. Patent Application Publication No. 2020/0341197 of Suzuki et al. (Suzuki, the present application) (Year: 2021).*

Feb. 26, 2019 International Search Report issued in International Patent Application No. PCT/JP2018/045922.

* cited by examiner

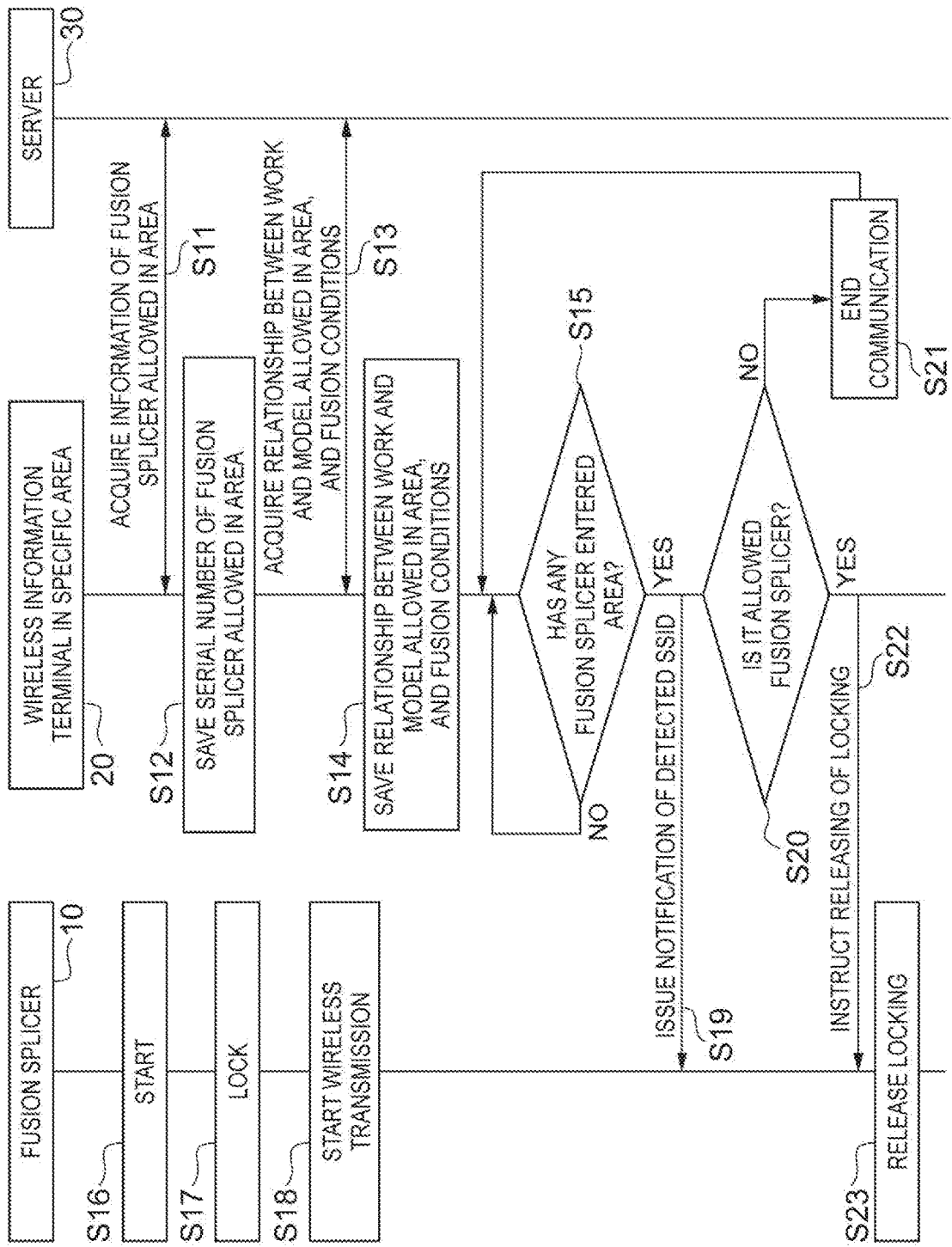

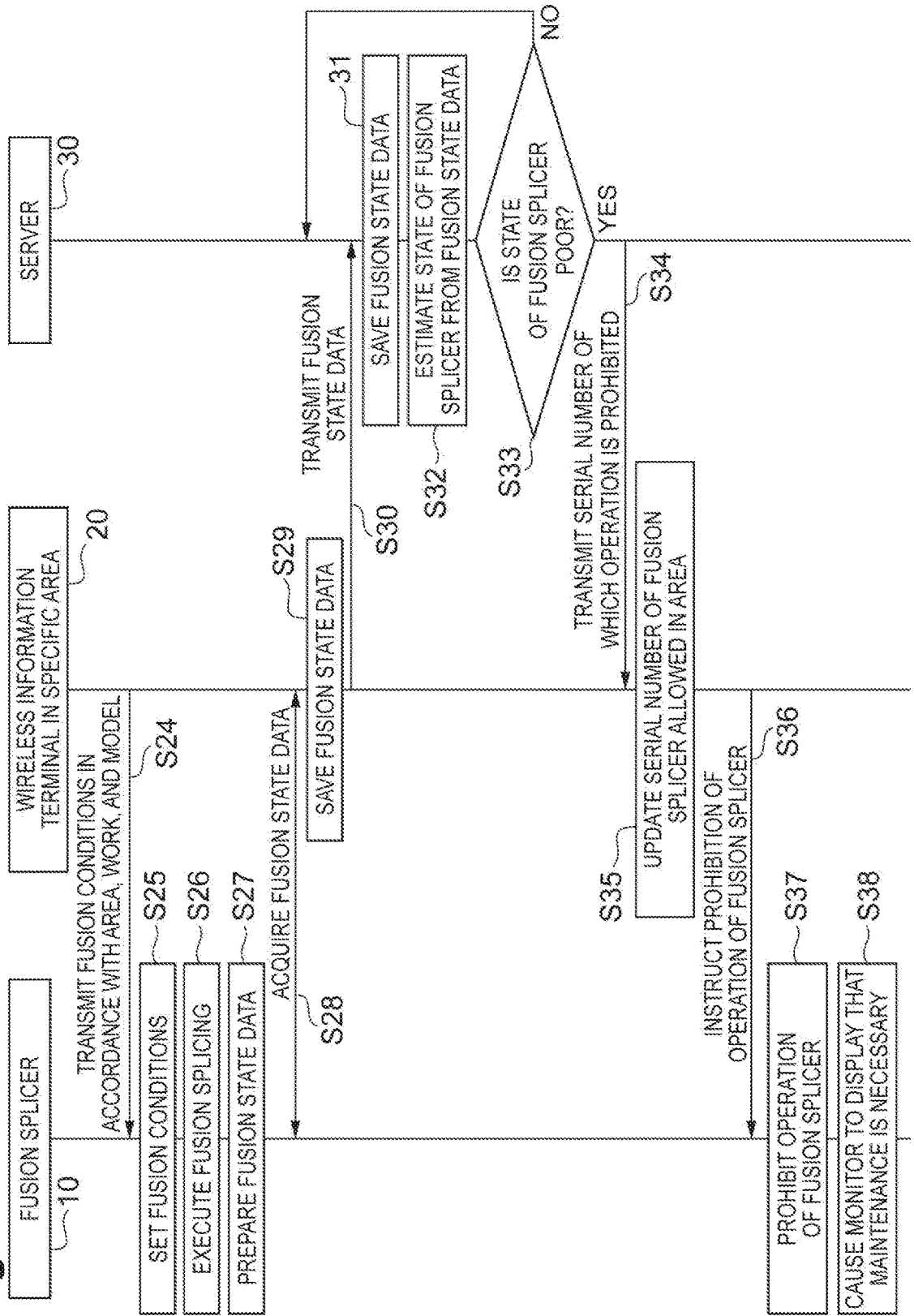

US 11,454,761 B2

FUSION CONNECTION DEVICE, WIRELESS INFORMATION TERMINAL, FUSION CONNECTION SYSTEM, AND FUSION CONNECTION METHOD

TECHNICAL FIELD

The present disclosure relates to a fusion splicer, a wireless information terminal, a fusion splicing system, and a fusion splicing method. The present application claims priority based on Japanese Patent Application No. 2017-246797, filed on Dec. 22, 2017, the entire contents disclosed in the application are incorporated herein by reference.

BACKGROUND ART

Patent Literature 1 discloses a fusion splicer which joins optical fibers to each other. In this fusion splicer, arc discharging is caused by a pair of discharging electrodes, and tips of the optical fibers are fusion spliced to each other through the arc discharging.

CITATION LIST

Patent Literature

Patent Literature 1: Japanese Unexamined Patent Publication No. JP2012-141357

SUMMARY OF INVENTION

The present disclosure provides a fusion splicer. The fusion splicer includes a fusion splicing unit that fusion splices optical fibers, a communication unit that communicates through wireless connection with an external terminal, and a setting unit that sets a fusion condition of the fusion splicing unit. The communication unit acquires information related to the fusion condition of the fusion splicing unit from the external terminal based on identification information of the fusion splicer. The setting unit sets the fusion condition of the fusion splicing unit based on the acquired information related to the fusion condition. The fusion splicing unit fusion splices in accordance with the fusion condition set by the setting unit.

The present disclosure provides a wireless information terminal. The wireless information terminal includes a communication unit, a detection unit, and an acquisition unit. The communication unit communicates through wireless connection with a fusion splicer that fusion splices optical fibers. The detection unit detects that the fusion splicer is positioned within a range in which the communication unit can communicate. The acquisition unit acquires information related to fusion condition used for the fusion splicing. The communication unit transmits the information related to the fusion condition to the fusion splicer detected by the detection unit.

The present disclosure provides a fusion splicing system. This fusion splicing system includes a fusion splicer and a wireless information terminal. The fusion splicer is configured to fusion splice optical fibers and includes a first communication unit capable of communicating with the outside through wireless connection. The wireless information terminal includes a second communication unit that communicates through wireless connection with the fusion splicer and an acquisition unit that acquires information related to fusion condition used for the fusion splicing from a server. The fusion splicer acquires the information related to the fusion condition acquired by the wireless information terminal from the wireless information terminal through wireless communication between the first communication unit and the second communication unit, and executes fusion splicing in accordance with fusion condition based on the acquired information related to the fusion condition.

The present disclosure provides a fusion splicing method. The fusion splicing method is a method for fusion splicing optical fibers in a fusion splicing system including a fusion splicer and a wireless information terminal. The fusion splicer is wirelessly connectable to the outside and is configured to fusion splice optical fibers. The wireless information terminal is wirelessly connectable to the fusion splicer and is capable of acquiring information related to fusion condition used for fusion splicing from a server. The fusion splicing method includes a step of wirelessly transmitting and a step of executing fusion splicing. In the step of wirelessly transmitting, the wireless information terminal acquires the information related to the fusion condition from the server and wirelessly transmits information related to the fusion splicing to the fusion splicer. In the step of executing fusion splicing, the fusion splicer acquires the information related to the fusion condition wirelessly transmitted from the wireless information terminal, and executes fusion splicing in accordance with fusion condition based on the acquired information related to the fusion condition.

BRIEF DESCRIPTION OF DRAWINGS

FIG. 9 is a sequence diagram for describing processing performed in the fusion splicing system illustrated in FIG. 3.

FIG. 10 is a sequence diagram for describing processing performed in the fusion splicing system illustrated in FIG. 3.

DESCRIPTION OF EMBODIMENT

Figure 1:
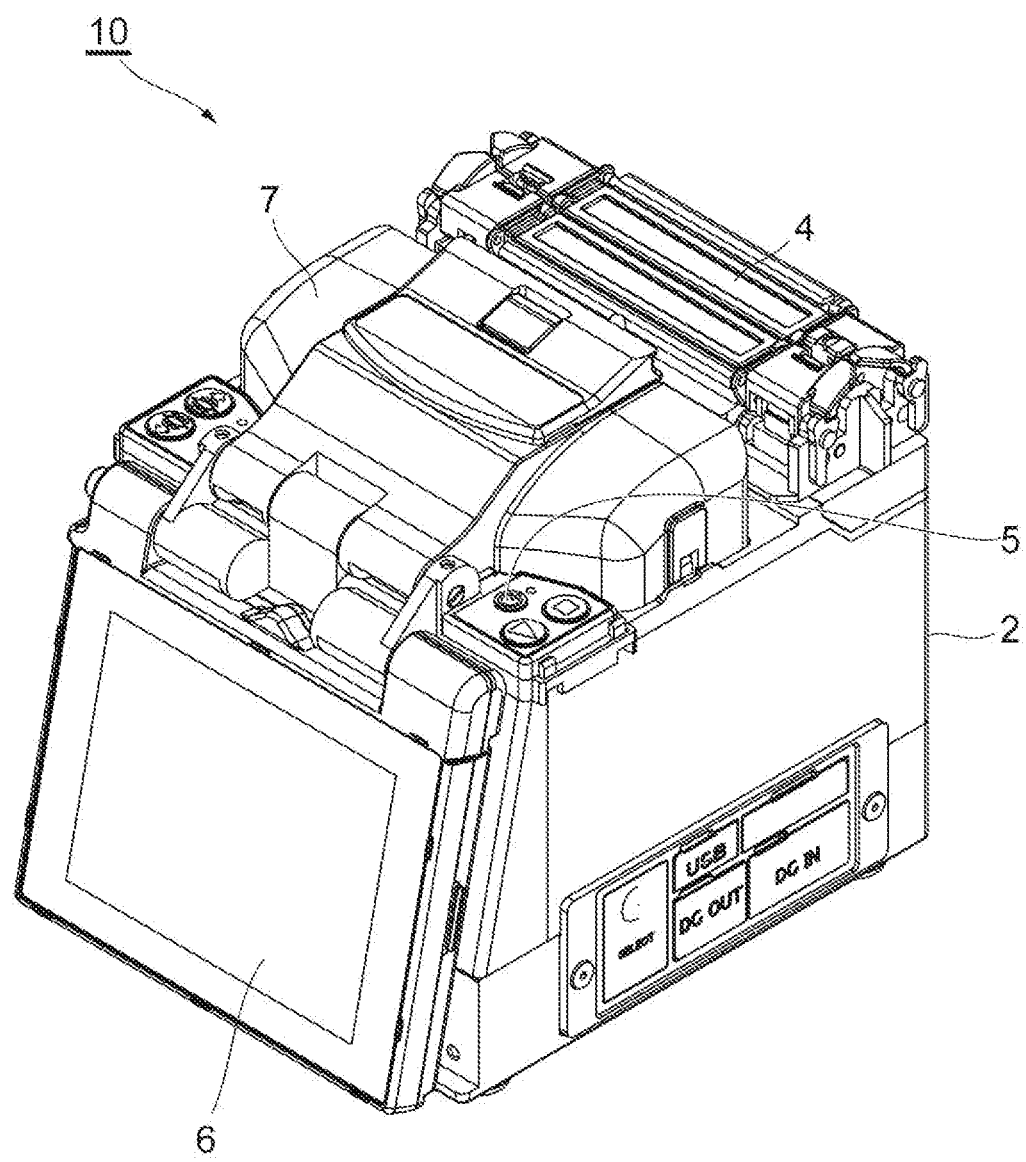
FIG. 1 is a perspective view of a fusion splicer for optical fibers according to an aspect.

Problem to be Solved by the Present Disclosure

There are a plurality of kinds of optical fibers (for example, single-core optical fibers, multi-core optical fibers, single-mode optical fibers, and multi-mode optical fibers) for fusion splicing, and thus optimum fusion conditions for fusion splicing can differ depending on the kind of optical fiber. As a countermeasure for this, parameters of fusion conditions can be changed in general fusion splicers. Generally, there are hundreds of combinations of parameters that can be set in a fusion splicer. Accordingly, workers are required to have deep knowledge and experience in order to operate a fusion splicer to set conditions suitable for fusion splicing (for example, parameters such as a discharging intensity of arc discharging, a discharging time, and positions of tips of optical fibers, which will hereinafter be referred to as "fusion conditions" as well).

A transmission loss in fusion-spliced optical fibers can vary depending on the fusion conditions. Accordingly, when suitable fusion conditions are not set in a fusion splicer, a transmission loss in optical fibers may exceed a permissible range or an optimum transmission loss may not be able to be achieved. There are cases where it is not easy to set suitable fusion conditions every time in such a case where optical fibers of different kinds are sequentially joined.

Effects of the Present Disclosure

According to the present disclosure, optical fibers can be easily fusion spliced under a suitable fusion condition.

DESCRIPTION OF EMBODIMENT OF THE PRESENT DISCLOSURE

Embodiments of the present disclosure will be enumerated and described. A fusion splicer according to one aspect of the present disclosure includes a fusion splicing unit that fusion splices optical fibers, a communication unit that communicates through wireless connection with an external terminal, and a setting unit that sets a fusion condition of the fusion splicing unit. The communication unit acquires information related to the fusion condition of the fusion splicing unit from the external terminal. The setting unit sets the fusion condition of the fusion splicing unit based on the acquired information related to the fusion condition. The fusion splicing unit fusion splices in accordance with the fusion conditions set by the setting unit.

In the fusion splicer, the communication unit is wirelessly connectable to the external terminal and acquires the information related to the fusion condition of the fusion splicing unit from the external terminal through the communication unit. The setting unit sets a fusion condition based on this information, and fusion splicing is performed in accordance with the set fusion conditions. In this case, the information related to the fusion condition suitable for fusion splicing of each of the optical fibers can be acquired from the outside through the communication unit. Thus, fusion splicing of each of the optical fibers can be easily performed under a fusion condition suitable for each of the optical fibers.

As one embodiment, the information related to the fusion condition may be set in accordance with a position of the fusion splicer in the above fusion splicer. Generally, the kind of optical fibers to be installed varies in accordance with an installation place. Accordingly, a fusion condition suitable for fusion splicing can also vary in accordance with an installation place. According to this fusion splicer, fusion splicing under a suitable fusion condition can be easily performed in accordance with the position of the fusion splicer.

As one embodiment, the fusion splicing unit may have a pair of discharging electrodes to fuse tips of the optical fibers through arc discharging in the above fusion splicer. The information related to the fusion condition may include at least one condition of a kind of the optical fibers, a discharging intensity of the arc discharging at the time of fusing the optical fibers, a discharging time thereof, positions of the tips of the optical fibers, and end surface angles of the optical fibers. In this case, the fusion splicer can fusion splice the optical fibers more suitably.

As one embodiment, the fusion splicer may further include a lock unit that allows and prohibits operation of the fusion splicing unit. The lock unit may allow operation of the fusion splicer based on a release signal received by the communication unit from the external terminal. In this case, the fusion splicer can be managed from the outside, and unsuitable fusion splicing can be prevented. In addition, theft of the fusion splicer can also be prevented.

As one embodiment, the lock unit may allow operation of the fusion splicing unit when the communication unit establishes wireless communication with the external terminal in the fusion splicer. According to this, for example, the fusion splicer can employ a use method in which the fusion splicer is allowed to be used when wireless connection is established in a state of being locked to prevent theft. According to this fusion splicer, both countermeasures for preventing theft and improvement of convenience can be achieved.

As one embodiment, the fusion splicer may further include a data preparation unit that prepares fusion state data indicating a fusion state of the optical fibers fusion spliced by the fusion splicing unit. The communication unit may transmit the fusion state data prepared by the data preparation unit to the external terminal. In this case, the fusion state data can be managed, and the fusion splicer can also be instructed based on the fusion state data.

A wireless information terminal according to another aspect of the present disclosure includes a communication unit that communicates through wireless connection with a fusion splicer that fusion splices optical fibers, a detection unit that detects that the fusion splicer is positioned within a range in which the communication unit can communicate, and an acquisition unit that acquires information related to a fusion condition used for the fusion splicing. The communication unit transmits the information related to the fusion condition to the fusion splicer detected by the detection unit.

In the wireless information terminal, the fusion splicer positioned within a range in which the communication unit can communicate is detected, and the information related to the fusion condition used for the fusion splicing is transmitted to the detected fusion splicer. In this case, for example, information related to suitable fusion condition can be transmitted to the fusion splicer within a range in which the wireless information terminal provided at an installation place can communicate. Thereby, information related to fusion condition suitable for fusion splicing of each of the optical fibers can be set in a predetermined fusion splicer.

As one embodiment, the information related to the fusion condition may be set in accordance with an area allocated to the wireless information terminal in the wireless information terminal. In this case, information related to a fusion condition suitable for each area allocated to each of the wireless information terminals can be individually set in the fusion splicer within each area.

As one embodiment, the information related to the fusion condition may include at least one condition of a kind of the optical fibers, a discharging intensity of arc discharging at the time of fusing the optical fibers, a discharging time thereof, positions of tips of the optical fibers, and end surface angles of the optical fibers in the wireless information terminal. In this case, fusion splicing of the optical fibers can be performed more suitably.

A fusion splicing system according to another aspect of the present disclosure includes a fusion splicer configured to fusion splice optical fibers and including a first communication unit capable of communicating with the outside through wireless connection, and a wireless information terminal including a second communication unit that communicates through wireless connection with the fusion splicer and an acquisition unit that acquires information related to a fusion condition used for the fusion splicing from a server. The fusion splicer acquires the information related to the fusion condition acquired by the wireless information terminal from the wireless information terminal through wireless communication between the first communication unit and the second communication unit. The fusion splicer executes fusion splicing in accordance with a fusion condition based on the acquired information related to the fusion condition.

In the fusion splicing system, the first communication unit of the fusion splicer is wirelessly connected to the second communication unit of the wireless information terminal to acquire the information related to the fusion condition in the fusion splicer from the wireless information terminal. The fusion splicer fusion splices in accordance with a fusion condition based on the acquired information. In this case, the information related to the fusion condition suitable for fusion splicing of each of the optical fibers can be acquired through both of the communication units, and each of the optical fibers can be easily fusion spliced under the fusion condition suitable for each of the optical fibers.

As one embodiment, the information related to the fusion condition may be set in accordance with an area allocated to the wireless information terminal in the fusion splicing system. In this case, fusion splicing under the suitable fusion condition can be easily performed in accordance with the area.

As one embodiment, the fusion splicer may include a pair of discharging electrodes to fuse tips of the optical fibers by arc discharging. The information related to the fusion condition may include at least one condition of a kind of the optical fibers, a discharging intensity of the arc discharging at the time of fusing the optical fibers, a discharging time thereof, positions of the tips of the optical fibers, and end surface angles of the optical fibers. In this case, the fusion splicing system can fusion splice the optical fibers more suitably.

As one embodiment, the fusion splicer may allow operation of fusion splicing when wireless connection between the first communication unit and the second communication unit is established in the fusion splicing system. According to this, for example, the fusion splicing system can allow the fusion splicer to be used when the fusion splicer which is locked to prevent theft establishes wireless connection. Thus, both countermeasures for preventing theft and improvement of convenience can be achieved.

As one embodiment, the fusion splicing system may further include a determination unit that determines whether operation of the fusion splicer is prohibited. The fusion splicer prepares fusion state data indicating a fusion state of the optical fibers. The determination unit determines whether operation of the fusion splicer is prohibited based on the fusion state data. The wireless information terminal may transmit an instruction signal for prohibiting operation of fusion splicing by the fusion splicer to the fusion splicer when the determination unit determines that operation of the fusion splicer is prohibited. According to this, for example, when the optical fibers are not suitably fusion spliced based on the fusion state data, the fusion splicing system can prohibit operation of fusion splicing by the fusion splicer.

A fusion splicing method according to another aspect of the present disclosure is a method for fusion splicing optical fibers in a fusion splicing system. The system includes a fusion splicer being wirelessly connectable to the outside and configured to fusion splice optical fibers, and a wireless information terminal being wirelessly connectable to the fusion splicer and capable of acquiring information related to a fusion condition from a server. The fusion splicing method includes a step in which the wireless information terminal acquires the information related to the fusion condition from the server and wirelessly transmits information related to the fusion splicing to the fusion splicer, and a step in which the fusion splicer acquires the information related to the fusion condition wirelessly transmitted from the wireless information terminal and executing fusion splicing in accordance with a fusion condition based on the acquired information related to the fusion condition.

In the fusion splicing method, the fusion splicer is wirelessly connected to the wireless information terminal and acquires the information related to the fusion condition in the fusion splicer from the wireless information terminal. The fusion splicer fusion splices in accordance with a fusion condition based on the acquired information. In this case, the information related to the fusion condition suitable for fusion splicing of each of the optical fibers can be acquired through wireless connection. Thus, each of the optical fibers can be easily fusion spliced under the fusion condition suitable for each of the optical fibers.

DETAILS OF EMBODIMENT OF THE PRESENT INVENTION

Specific examples of a fusion splicer for optical fibers according to an embodiment of the present disclosure will be described below with reference to the drawings. The present invention is not limited to the examples. The present invention is indicated by the claims, and it is intended to include all the changes within meanings and a range equivalent to the claims. In the following description, the same reference signs are applied to the same elements in description of the drawings, and duplicate description will be omitted.

Figure 2:
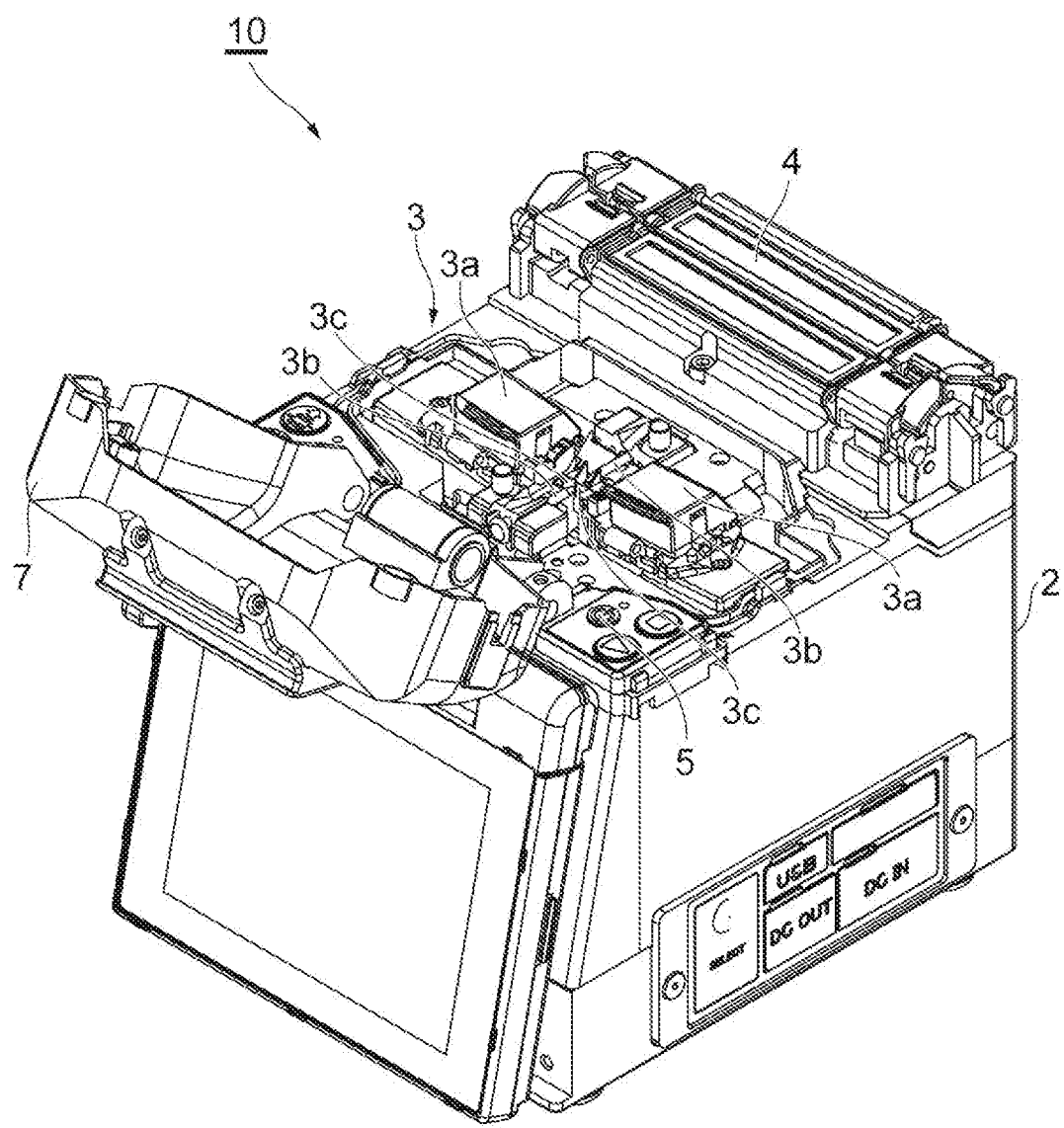
FIG. 2 is a perspective view illustrating a fusion splicing mechanism for optical fibers in the fusion splicer illustrated in FIG. 1.

A constitution of a fusion splicer 10 used in a fusion splicing system 1 will be described with reference to FIGS. 1 and 2. FIGS. 1 and 2 are perspective views illustrating the appearance of the fusion splicer. FIG. 1 illustrates the appearance of the fusion splicer in a state where a windshield cover is closed, and FIG. 2 illustrates the appearance in a state where the windshield cover is opened such that the internal structure of the fusion splicer can be viewed. The fusion splicer 10 is an apparatus for fusion splicing optical fibers to each other and includes a box-shaped housing 2 as illustrated in FIGS. 1 and 2. In an upper portion of the housing 2, a fusion mechanism 3 for fusing optical fibers to each other, a heater 4 for heating and shrinking a fiber reinforcing sleeve covering a fusion splicing part of optical fibers to be fused by the fusion mechanism 3, and a switch 5 operated by a user for switching between ON and OFF of a power source of the fusion splicer 10 are provided. The fusion splicer 10 includes a monitor 6 for displaying images of fusion splicing states between optical fibers captured by a camera (not illustrated) disposed inside the housing 2. Moreover, the fusion splicer 10 includes a windshield cover 7 for preventing wind from entering the fusion mechanism 3.

As illustrated in FIG. 2, the fusion mechanism 3 has a pair of fiber positioning units 3a, a pair of discharging electrodes 3b, and a holder mounting unit in which a pair of optical fiber holders 3c can be mounted. Each of optical fibers (fusion targets) is held and fixed to the optical fiber holders 3c, and each of the optical fiber holders is mounted and fixed to the holder mounting unit. Both of the optical fiber holders 3c are disposed between the pair of fiber positioning units 3*a*. The pair of fiber positioning units 3*a* set positions of tips of optical fibers which are respectively held by the optical fiber holders 3*c*. The pair of discharging electrodes 3*b* are disposed between the fiber positioning units 3*a* and fuse tips of a pair of optical fibers to each other through arc discharging.

In the fusion splicer 10, information related to fusion conditions when optical fibers are fused, such as positions of tips of optical fibers set by the fiber positioning units 3*a* and conditions for arc discharging (for example, a discharging intensity and a discharging time) performed by the discharging electrodes 3*b* are saved in a storage unit 12, which will be described below. The information related to the fusion conditions includes at least one condition of the kind of optical fibers, the discharging intensity and the discharging time of arc discharging at the time of fusing fibers, the positions of tips of optical fibers, and the end surface angles of optical fibers. The fusion splicer 10 stores operation software in a RAM 10*b* (which will be described below) or the like. The fiber positioning units 3*a* and the discharging electrodes 3*b* are controlled using the operation software described above in accordance with the information related to the fusion conditions saved in the storage unit 12. The fusion splicer 10 is equipped with a wireless communication module 10*e*, which will be described below, (or a wireless built-in card), and updating of the operation software described above, rewriting of the information related to the fusion conditions saved in the storage unit 12, and the like are performed through wireless connection.

Figure 3:
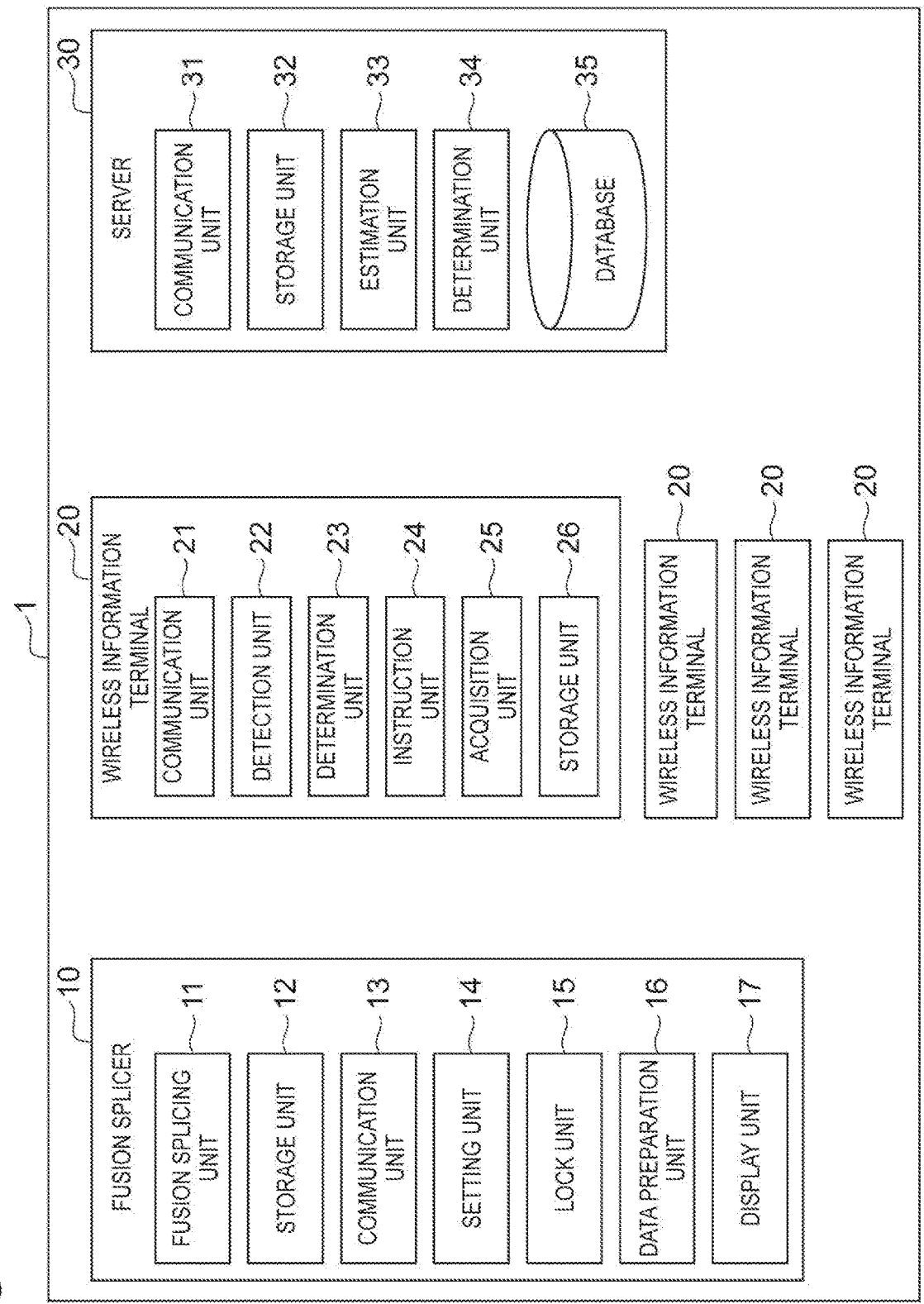
FIG. 3 is a block diagram of functions of a fusion splicing system for optical fibers according to the aspect.
Figure 4:
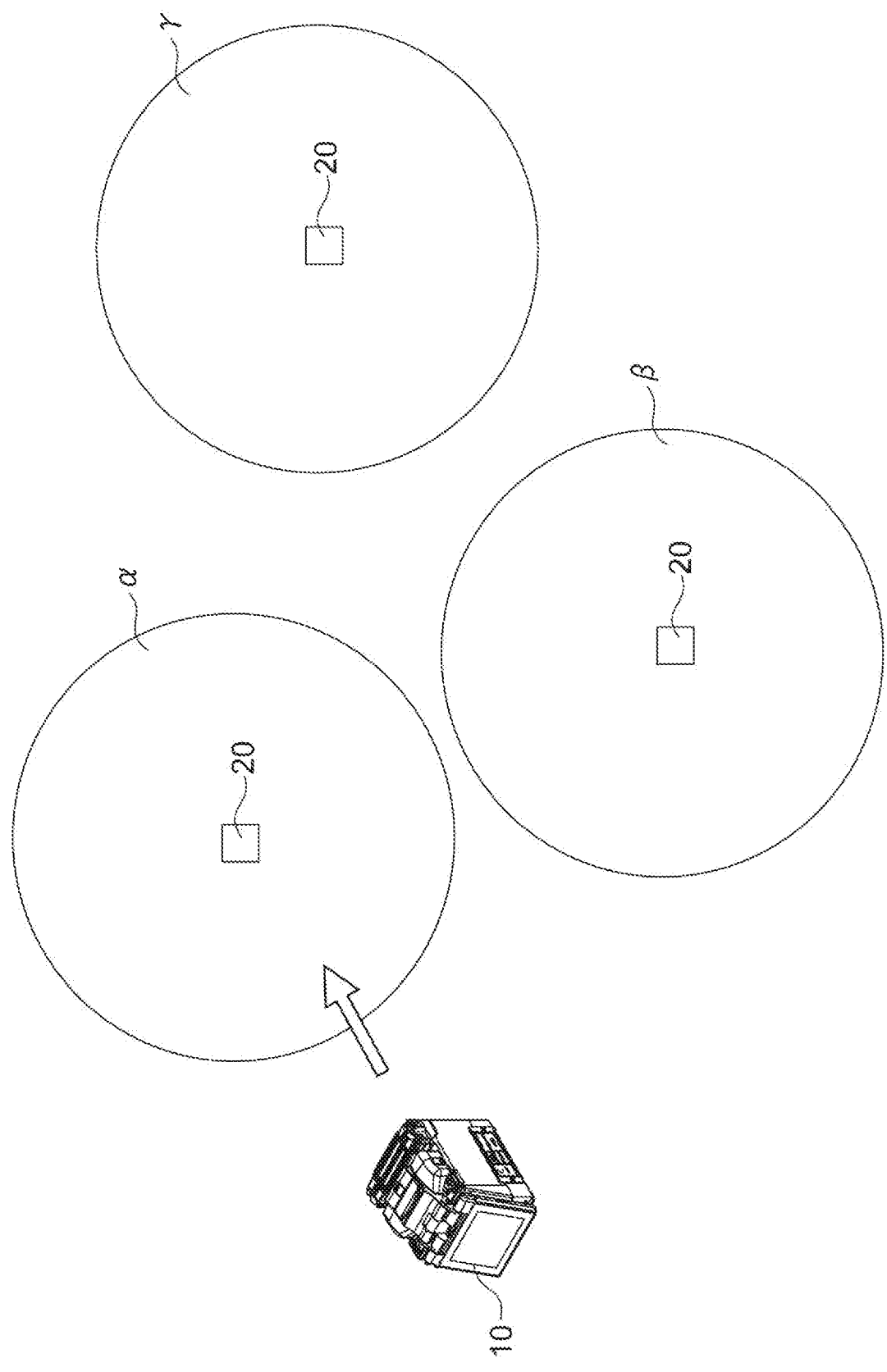
FIG. 4 is a view for describing an overview of the fusion splicing system illustrated in FIG. 3.
Figure 5:
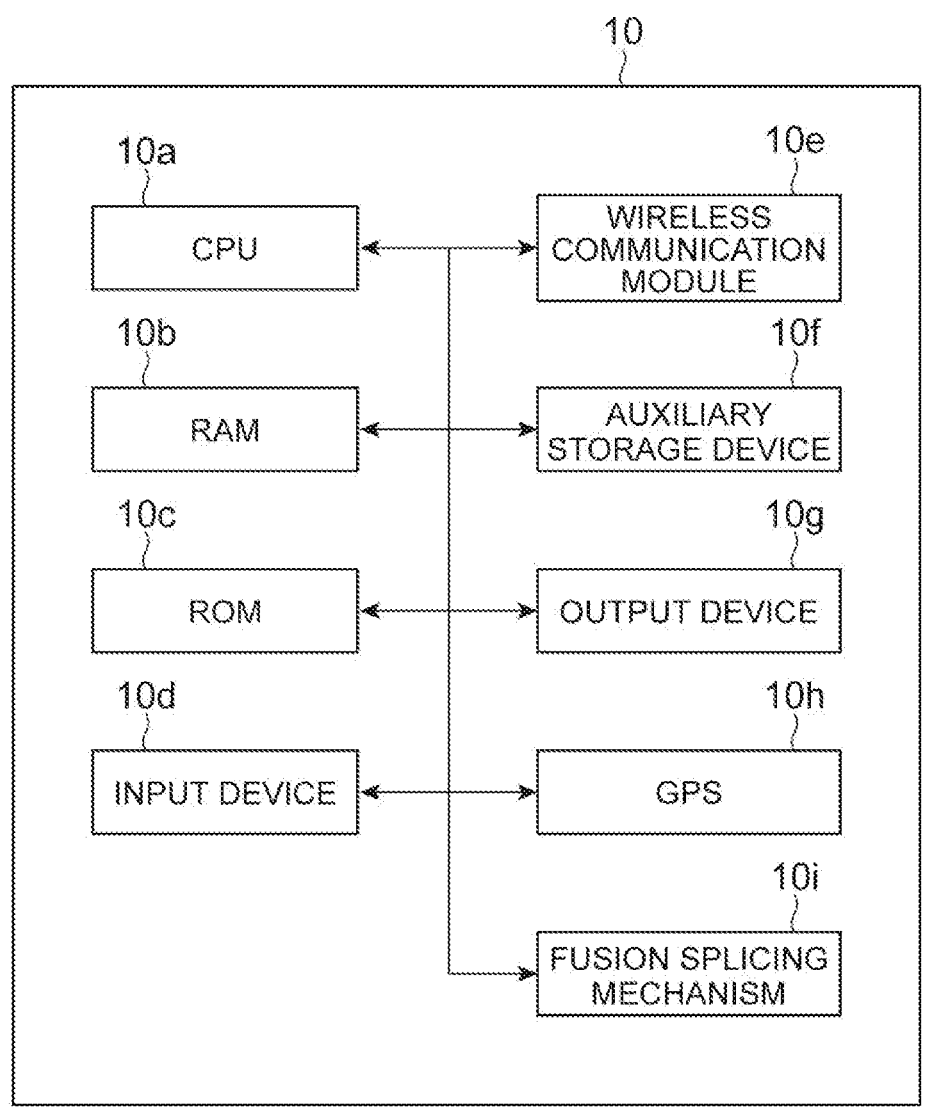
FIG. 5 is a block diagram illustrating a hardware constitution of the fusion splicer illustrated in FIG. 3.
Figure 6:
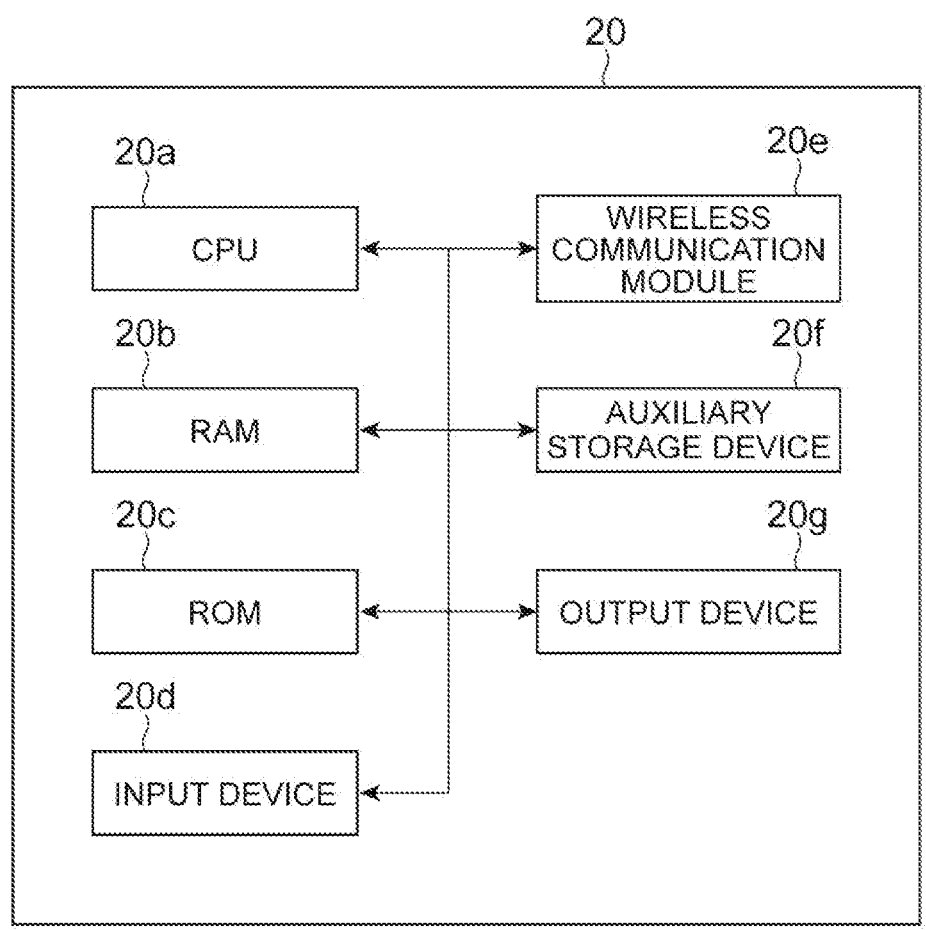
FIG. 6 is a block diagram illustrating a hardware constitution of a wireless monitoring terminal illustrated in FIG. 3.
Figure 7:
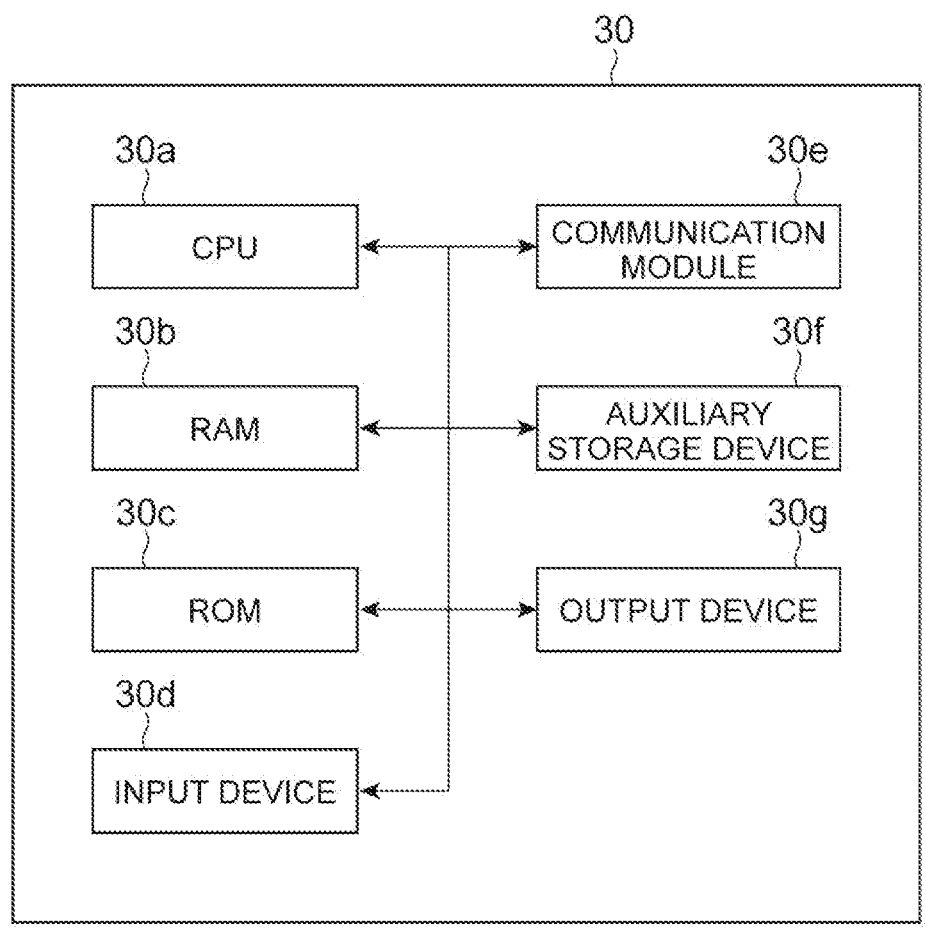
FIG. 7 is a block diagram illustrating a hardware constitution of a server illustrated in FIG. 3.

Next, a fusion splicing system using the fusion splicer 10 according to the present embodiment will be described with reference to FIGS. 3 to 7. FIG. 3 is a block diagram of functions of the fusion splicing system according to the present embodiment. FIG. 4 illustrates an application example of the fusion splicing system according to the present embodiment. FIG. 5 is a block diagram illustrating a hardware constitution of the fusion splicer illustrated in FIG. 3. FIG. 6 is a block diagram illustrating a hardware constitution of a wireless information terminal illustrated in FIG. 3. FIG. 7 is a block diagram illustrating a hardware constitution of a server illustrated in FIG. 3.

As illustrated in FIG. 3, the fusion splicing system 1 includes the fusion splicer 10 described above, a plurality of wireless information terminals 20, and a server 30. The fusion splicer 10 communicates wirelessly with each of the wireless information terminals 20. The server 30 communicates wirelessly with each of the wireless information terminals 20 (partially including an electric communication line such as the Internet).

Each of the plurality of wireless information terminals 20 illustrated in FIG. 4 is provided in a different installation place. At each of the installation places, optical fibers having kinds different from each other are installed. Each of the plurality of wireless information terminals 20 transmits radio waves in a surrounding area (area α, β, or γ) having a radius of approximately 10 m. Accordingly, for example, as illustrated in FIG. 4, when a user carries the fusion splicer 10 in the area α in order to fusion splice at the installation place, the fusion splicer 10 and the wireless information terminal 20 transmitting radio waves to the area α start to communicate with each other. In other words, the wireless information terminal 20 transmitting radio waves to the area α starts to communicate with the fusion splicer 10 which has entered the area α. In the present embodiment, communication between the wireless information terminal 20 and the fusion splicer 10 is bidirectional communication. The communication may be unidirectional communication in which the wireless information terminal 20 acquires information (ID, model information, and the like) of the fusion splicer 10 and transmits the information to the fusion splicer 10. A communication distance (radius of the area α, β, or γ) between the wireless information terminal 20 and the fusion splicer 10 varies depending on the kind of method for wireless communication or the environment. For example, in the case of Wi-Fi, the communication distance is within a radius range of roughly several tens of meters to approximately 100 m, and in the case of Bluetooth (registered trademark of Bluetooth SIG, Inc.), the communication distance is within a radius range of roughly several meters to ten and a few meters.

As illustrated in FIG. 3, the fusion splicer 10 functionally includes a fusion splicing unit 11, the storage unit 12, a communication unit 13, a setting unit 14, a lock unit 15, a data preparation unit 16, and a display unit 17. As illustrated in FIG. 5, the fusion splicer 10 is constituted to include a computer as a control unit therefor having hardware such as a CPU 10*a*, the RAM 10*b*, a ROM 10*c*, an input device 10*d*, the wireless communication module 10*e*, an auxiliary storage device 10*f*, and an output device 10*g*. When these constituent elements are operated by a program or the like, each function (which will be described below) of the fusion splicer 10 is exhibited. In addition, the fusion splicer 10 includes a GPS terminal 10*h* and various fusion splicing mechanisms 10*i* in addition to the control unit. The fusion splicer 10 may have a constitution capable of acquiring positional information such as a longitude or a latitude using the GPS terminal 10*h*. The fusion splicing mechanism 10*i* is a mechanism for fusion splicing in the fusion mechanism 3 described above and includes the pair of fiber positioning units 3*a*, the pair of discharging electrodes 3*b*, the pair of optical fiber holders 3*c*, and the like.

As illustrated in FIG. 3, as functional units, the wireless information terminal 20 includes a communication unit 21 (second communication unit), a detection unit 22, a determination unit 23, an instruction unit 24, an acquisition unit 25, and a storage unit 26. As illustrated in FIG. 6, the wireless information terminal 20 is constituted to include a computer having hardware such as a CPU 20*a*, a RAM 20*b*, a ROM 20*c*, an input device 20*d*, a wireless communication module 20*e*, an auxiliary storage device 20*f*, and an output device 20*g*. When these constituent elements are operated by a program or the like, each function (which will be described below) of the wireless information terminal 20 is exhibited.

As illustrated in FIG. 3, as functional units, the server 30 includes a communication unit 31, a storage unit 32, an estimation unit 33, a determination unit 34, and a database 35. As illustrated in FIG. 7, the server 30 is constituted to include a computer having hardware such as a CPU 30*a*, a RAM 30*b*, a ROM 30*c*, an input device 30*d*, a communication module 30*e*, an auxiliary storage device 30*f*, and an output device 30*g*. When these constituent elements are operated by a program or the like, each function (which will be described below) of the server 30 is exhibited.

The fusion splicing unit 11 is constituted of the fusion splicing mechanism 10*i* described above, and fusion splices a pair of optical fibers disposed in the fusion splicer 10. Fusion conditions used for fusion splicing in the fusion splicing unit 11 are stored in the storage unit 12. For example, the fusion conditions to be stored include the kind of optical fibers, the discharging intensity and the discharging time of arc discharging at the time of fusing optical fibers, the positions of tips of optical fibers, the end surface angles of optical fibers, and the like.

The communication unit 13 of the fusion splicer 10 communicates through wireless connection with the communication unit 21 of the wireless information terminal 20 that is an external terminal. For example, the communication unit 13 is constituted to include a wireless LAN card or the like and communication wirelessly with the wireless information terminal 20 (which will be described below) at a band of 2.4 GHz conforming to IEEE 802.11. A service set identifier (SSID, an identifier) of a unique wireless access point (wireless AP) of each fusion splicer 10 is wirelessly transmitted within a radius range of approximately 10 m, for example. For example, an SSID of the wireless AP of a first fusion splicer 10 is "T71C_420000001", an SSID of the wireless AP of a second fusion splicer 10 is "T71C_420000002", an SSID of the wireless AP of a third fusion splicer 10 is "T71C_420000003", and an SSID of the wireless AP of a fourth fusion splicer 10 is "T71C_420000004". In this manner, the fusion splicers 10 respectively have identifiers different from each other.

The communication unit 13 of the fusion splicer 10 acquires the information related to the fusion conditions used for fusion splicing from the wireless information terminals 20 through the communication units 21 of the wireless information terminals 20. For example, when the fusion splicer 10 enters the area α, the communication unit 13 acquires fusion conditions to be used for fusion splicing within the area α from the wireless information terminal 20. The information related to the fusion conditions is set in accordance with an area allocated to the wireless information terminal 20. In other words, the information related to the fusion conditions is set in accordance with a position of the fusion splicer. In the present embodiment, when the fusion splicer 10 starts, prohibition (locking) of operation of the fusion splicing unit 11 is set. The communication unit 13 also receives a release signal for releasing locking set in the fusion splicer 10 from the wireless information terminal 20. The fusion splicer 10 does not have to have a lock function prohibiting operation of the fusion splicing unit 11.

The setting unit 14 of the fusion splicer 10 sets fusion conditions in the fusion splicing unit 11 in accordance with the information related to the fusion conditions acquired by the communication unit 13 from the wireless information terminal 20. For example, the setting unit 14 may set the fusion conditions to be used for fusion splicing within the area α in the fusion splicing unit 11 in accordance with the information related to the fusion conditions acquired from the wireless information terminal 20. The communication unit 11 of the fusion splicer 10 may acquire information indicating the area α where the wireless information terminal 20 is positioned from the wireless information terminal 20 as information related to the fusion conditions, and the setting unit 14 may automatically set the fusion conditions in accordance with the area α. The fusion splicing unit 11 fusion splices in accordance with the fusion conditions set by the setting unit 14.

The lock unit 15 of the fusion splicer 10 prohibits (sets locking) operation of the fusion splicing unit 11 when the fusion splicer 10 starts. Thereafter, the lock unit 15 allows and prohibits (releases and sets locking on) operation of the fusion splicing unit 11 in accordance with communication between the communication unit 13 and the wireless information terminal 20. In the present embodiment, the lock unit 15 releases locking in accordance with a release signal for releasing locking received by the communication unit 13 from the wireless information terminal 20, and allows operation of the fusion splicing unit 11. The lock unit 15 allows operation of the fusion splicing unit 11 when the communication unit 13 establishes wireless communication with the wireless information terminal 20. The lock unit 15 prohibits (sets locking on) operation of the fusion splicing unit 11 when communication between the communication unit 13 and a corresponding wireless information terminal 20 is disconnected. That is, the lock unit 15 prohibits operation of the fusion splicing unit 11 when the communication unit 13 does not communication wirelessly with the wireless information terminal 20.

The data preparation unit 16 of the fusion splicer 10 prepares fusion state data indicating a fusion state of fusion-spliced optical fibers after fusion splicing is performed by the fusion splicing unit 11. Examples of a fusion state mentioned herein include axial misalignment between optical fibers, deviation in connection angle, a gap, an outer diameter and a length of a connection part, and the presence or absence of air bubbles generated in a connection part. The communication unit 13 of the fusion splicer 10 transmits the fusion state data prepared by the data preparation unit 16 to the wireless information terminal 20.

The display unit 17 of the fusion splicer 10 causes the monitor 6 to display information related to various states of the fusion splicer 10 (for example, a state where operation of the fusion splicing unit 11 is prohibited), setting operation information of the fusion splicer 10, a state between fusion spliced optical fibers, or the like. For example, based on the information received from the wireless information terminal 20, the display unit 17 causes the monitor 6 to display that maintenance is necessary.

The communication unit 21 of the wireless information terminal 20 communicates with the communication unit 13 of the fusion splicer 10 through wireless connection. The communication unit 21 also communicates with the server 30 through wireless and wired connection. For example, the communication unit 21 communicates wirelessly with the communication unit 13 of the fusion splicer 10 at a band of 2.4 GHz conforming to IEEE 802.11.

The acquisition unit 25 of the wireless information terminal 20 acquires various kinds of information through the communication unit 21. The acquisition unit 25 may acquire various kinds of information from an element other than the communication unit 21. Various kinds of information acquired by the acquisition unit 25 are saved in the storage unit 26.

In the present embodiment, through the communication unit 21, the acquisition unit 25 acquires information of the fusion splicer 10 (for example, a model, an SSID, or a serial number) of which operation such as fusion splicing is allowed within an area (for example, the area α) where the wireless information terminal is positioned, a type of work allowed within the area, and fusion conditions used for fusion splicing of the fusion splicer 10. The information of the fusion splicer 10 of which operation such as fusion splicing is allowed within an area where the wireless information terminal is positioned, the type of work allowed within the area, and the fusion conditions used for fusion splicing of the fusion splicer 10 are associated with each other and are saved in the storage unit 26.

The acquisition unit 25 of the wireless information terminal 20 acquires the fusion state data prepared by the data preparation unit 16 through the communication unit 13. The storage unit 26 saves the fusion state data acquired by the acquisition unit 25.

The detection unit 22 of the wireless information terminal 20 detects entry of the fusion splicer 10 into a range (for example, the area α) in which the communication unit 21 can communicate. The detection unit 22 detects the SSID of the fusion splicer 10 which has entered a range in which the communication unit 21 can communicate. When the detection unit 22 detects an SSID, the communication unit 21 notifies the communication unit 13 of the fusion splicer 10 of the fact that an SSID has been detected. The determination unit 23 of the wireless information terminal 20 refers to the storage unit 26 and determines whether or not operation of the fusion splicer 10 detected by the detection unit 22 is allowed within the area (for example, the area α) where the wireless information terminal 20 is positioned.

The instruction unit 24 of the wireless information terminal 20 instructs setting and releasing of locking to the lock unit 15 of the fusion splicer 10. The instruction unit 24 instructs releasing of locking to the fusion splicer 10 of which operation of fusion splicing is determined to be allowed by the determination unit 23. The instruction unit 24 refers to the storage unit 26 and instructs setting of locking to the fusion splicer 10 of which operation of fusion splicing is prohibited. Specifically, the instruction unit 24 instructs setting of locking to the fusion splicer 10 of which the serial number (or the SSID) is not stored in the storage unit 26. The communication unit 21 of the wireless information terminal 20 transmits a signal for instructing setting and releasing of locking (prohibiting and allowing of fusion splicing) from the instruction unit 24 to the communication unit 13 of the fusion splicer 10. When the determination unit 23 determines that operation of fusion splicing is allowed, and when releasing of locking is instructed from the instruction unit 24, the communication unit 21 transmits the information related to the fusion conditions to the fusion splicer 10 in addition to a release signal for instructing releasing of locking.

The communication unit 31 of the server 30 communicates with the communication unit 21 of the wireless information terminal 20 through wired and wireless connection. For example, the communication unit 31 communicates with the communication unit 21 of the wireless information terminal 20 through an ordinary Internet line or the like (including wireless connection). The communication unit 31 acquires the fusion state data prepared by the data preparation unit 16 through the communication unit 21 of the wireless information terminal 20.

The storage unit 32 of the server 30 stores information of a usable area (for example, the area α) for each model of the fusion splicer 10 in the database 35. For each serial number (or SSID) of the fusion splicer 10, the storage unit 32 stores allowance information and prohibition information on each process of work that can be performed by the fusion splicer 10 in the database 35. Allowance information is information indicating whether or not execution of the fusion splicer 10 is allowed for each process of work. Prohibition information is information indicating whether or not execution of the fusion splicer 10 is prohibited for each process of work. The storage unit 32 stores fusion conditions used for fusion splicing for each combination of an area (for example, the area α, β, or γ), a model of the fusion splicer 10, and allowed work in the database 35. The storage unit 32 stores the fusion state data acquired from the wireless information terminal 20 through the communication unit 31, associated with the serial number (or the SSID) of the fusion splicer 10, in the database 35.

The estimation unit 33 of the server 30 estimates a state of the fusion splicer 10 from the fusion state data stored in the database 35. For example, when a foreign substance is present in the optical fiber holders 3c, axial misalignment or deviation in connection angle may occur between optical fibers. When the discharging intensity is excessively weak or the discharging time is excessively short in the fusion splicing unit 11, air bubbles may be included between optical fibers. When the discharging intensity is excessively strong or the discharging time is excessively long in the fusion splicing unit 11, optical fibers may not be joined to each other. When a pushing amount of a pair of optical fibers at the time of fusion splicing is excessive in a direction in which tips of the optical fibers face each other, a connection part between the optical fibers may be thickened or deformed. When a pushing amount of a pair of optical fibers at the time of performing fusion splicing is insufficient in a direction in which tips of the optical fibers face each other, the optical fibers may not be reliably joined to each other. In this manner, diverse problems are caused in a fusion state between optical fibers depending on the state of the fusion splicer 10. Thus, the estimation unit 33 can estimate the state of the fusion splicer 10 from the fusion state data indicating a fusion state between optical fibers.

The determination unit 34 of the server 30 determines whether or not operation of the fusion splicer 10 (fusion splicing unit 11) is prohibited based on the fusion state data prepared by the data preparation unit 16. Specifically, when it is determined that the state of the fusion splicer 10 is poor from estimation results of the estimation unit 33, the determination unit 34 determines that operation of the fusion splicer 10 (fusion splicing unit 11) is prohibited. For example, in the estimation unit 33, when it is estimated that the discharging intensity or the discharging time has not been suitably set, and when it is estimated that the pushing amount of optical fibers is excessive or insufficient, the determination unit 34 determines that the state of the fusion splicer 10 is poor.

The communication unit 31 of the server 30 transmits the serial number (or the SSID) of the fusion splicer 10 of which operation of fusion splicing is prohibited to the wireless information terminal 20 when the determination unit 34 determines that operation of the fusion splicer 10 is prohibited. The acquisition unit 25 of the wireless information terminal 20 acquires the serial number (or the SSID) transmitted from the communication unit 31 of the server 30 through the communication unit 21. The storage unit 26 of the wireless information terminal 20 updates information of the fusion splicer 10, of which operation is allowed, stored in the storage unit 26 in accordance with the serial number (or the SSID) acquired by the acquisition unit 25. Specifically, the storage unit 26 deletes information of the fusion splicer 10 corresponding to the serial number of which operation of fusion splicing is prohibited.

Figure 8:
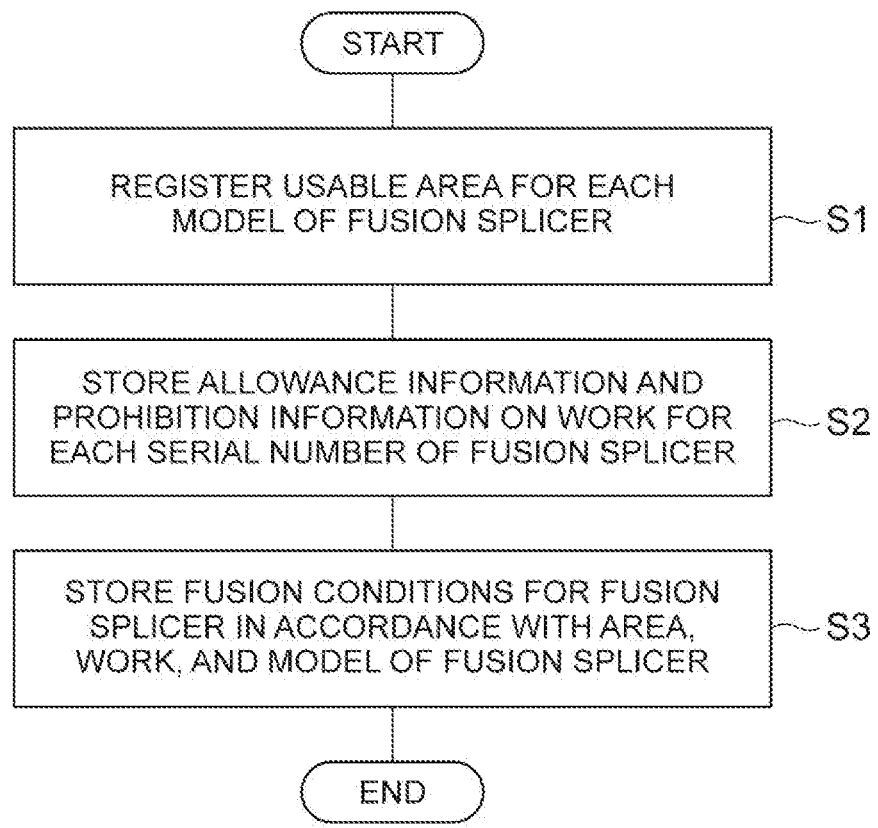
FIG. 8 is a flowchart for describing processing performed in the server illustrated in FIG. 7.

Next, with reference to FIG. 8, processing performed in advance in the fusion splicing system 1 will be described. First, the storage unit 32 of the server 30 stores the usable area α, β, and γ for each model of the fusion splicer 10 in the database 35 (Step S1). Next, for each serial number (or SSID) of the fusion splicer 10, the storage unit 32 stores allowance information and prohibition information on each process of work that can be performed by the fusion splicer 10 in the database 35 (Step S2). Next, the storage unit 32 stores fusion conditions used for fusion splicing for each combination of the area α, β, or γ, allowed work, and a model of the fusion splicer 10 in the database 35 (Step S3).

Next, with reference to FIGS. 9 and 10, processing performed in the fusion splicing system 1 will be described.

The acquisition unit 25 of the wireless information terminal 20 (which will hereinafter be simply referred to as "a wireless information terminal 20" as well) provided in a specific area (which will hereinafter be referred to as "an area α" as well) acquires the serial number (or the SSID) of the fusion splicer 10 of which operation is allowed in the area α from the server 30 through the communication unit 21 (Step S11). The storage unit 26 of the wireless information terminal 20 saves the serial number (or the SSID) acquired from the server 30 (Step S12). Subsequently, the acquisition unit 25 of the wireless information terminal 20 acquires a relationship between the model of the fusion splicer 10 of which operation is allowed in the area α and the allowed work, and the fusion conditions, from the server 30 through the communication unit 21 (Step S13). The storage unit 26 of the wireless information terminal 20 saves a relationship between the model of the fusion splicer 10 and the allowed work, and the fusion conditions, acquired from the server 30 (Step S14).

Next, the detection unit 22 of the wireless information terminal 20 determines whether or not there is any fusion splicer 10 which has entered the area α (Step S15). In Step S15, when it is determined that there is a fusion splicer 10 which has entered the area α, the processing proceeds to Step S19 (YES in Step S15). In Step S15, when it is determined that there is no fusion splicer 10 which has entered the area α, the processing repeats Step S15 (NO in Step S15).

The fusion splicer 10 is started when a user turns on the power source by operating the switch 5 (Step S16). The lock unit 15 of the fusion splicer 10 prohibits operation of the fusion splicing unit 11 immediately after being started (Step S17). That is, the lock unit 15 sets locking in Step S17. Next, the fusion splicer 10 sets the communication unit 13 in a state where wireless communication can be performed (Step S18). In the present embodiment, in Step S18, the communication unit 13 transmits radio waves in a surrounding area of the fusion splicer 10.

When it is determined that a fusion splicer 10 has entered the area α, the communication unit 21 of the wireless information terminal 20 notifies the communication unit 13 of the fusion splicer 10 of that fact that an SSID has been detected (Step S19). When an SSID is detected in Step S19, the detection unit 22 of the wireless information terminal 20 refers to the storage unit 26 and determines whether or not operation of the fusion splicer 10 having the detected SSID is allowed in the area α (Step S20). In Step S20, when it is determined that operation of the fusion splicer 10 having the detected SSID is not allowed in the area α, the processing proceeds to Step S21 (NO in Step S20). When it is determined that operation of the fusion splicer 10 having the detected SSID is allowed in the area α, the processing proceeds to Step S22 (YES in Step S20).

When it is determined that operation of the fusion splicer 10 having the detected SSID is not allowed in the area α, the communication unit 21 of the wireless information terminal 20 ends communication with the fusion splicer 10 (Step S21), and the processing returns to Step S15. When it is determined that operation of the fusion splicer 10 having the detected SSID is allowed in the area α, the instruction unit 24 of the wireless information terminal 20 transmits a release signal for instructing releasing of locking to the fusion splicer 10 through the communication unit 21 (Step S22). When a release signal for instructing releasing of locking is received from the wireless information terminal 20 through the communication unit 13, the lock unit 15 of the fusion splicer 10 releases locking and allows operation of the fusion splicing unit 11 (Step S23).

Subsequently, as illustrated in FIG. 10, the communication unit 21 of the wireless information terminal 20 refers to the storage unit 26 and transmits the fusion conditions corresponding to the work allowed in the area α and the model of the fusion splicer 10, to the fusion splicer 10 (Step S24). Subsequently, the fusion splicing unit 11 of the fusion splicer 10 sets the fusion conditions received from the wireless information terminal 20 through the communication unit 13 (Step S25). The fusion splicing unit 11 of the fusion splicer 10 executes fusion splicing under the set fusion conditions (Step S26). The data preparation unit 16 of the fusion splicer 10 prepares fusion state data of fusion spliced optical fibers after fusion splicing is executed (Step S27). The acquisition unit 25 of the wireless information terminal 20 acquires the fusion state data prepared by the fusion splicer 10 through the communication unit 21 (Step S28). The storage unit 26 of the wireless information terminal 20 saves the acquired fusion state data (Step S29). The communication unit 21 of the wireless information terminal 20 transmits the saved fusion state data to the server 30 (Step S30).

Subsequently, the storage unit 32 of the server 30 saves the fusion state data received from the wireless information terminal 20 in the database 35 (Step S31). The estimation unit 33 of the server 30 estimates a state of the fusion splicer 10 from the saved fusion state data (Step S32). The determination unit 34 of the server 30 determines whether or not the estimated state of the fusion splicer 10 is poor (Step S33). When the determination unit 34 determines that the state of the fusion splicer 10 is not poor, the processing returns to a state before Step S31, that is, a standby state before the fusion state data is received. When the determination unit 34 determines that the state of the fusion splicer 10 is poor, the determination unit 34 determines that operation of the fusion splicer 10 is prohibited. In this case, the processing proceeds to Step S34. When the determination unit 34 determines that operation of the fusion splicer 10 is prohibited, the communication unit 31 of the server 30 transmits the serial number of the fusion splicer 10 of which operation of fusion splicing is prohibited to the wireless information terminal 20 (Step S34).

When the serial number of which operation of fusion splicing is prohibited is received from the server 30 through the communication unit 21, the storage unit 26 of the wireless information terminal 20 updates information (for example, the serial number) of the fusion splicer 10 of which operation is allowed (Step S35). The instruction unit 24 of the wireless information terminal 20 refers to the storage unit 26 and transmits an instruction signal for prohibiting operation of the fusion splicing unit 11 through the communication unit 21 to the fusion splicer 10 having the serial number of which operation of fusion splicing is prohibited (Step S36). Specifically, the instruction unit 24 transmits an instruction signal for instructing setting of locking through the communication unit 21 to the fusion splicer 10 of which the serial number is not stored in the storage unit 26.

Subsequently, when an instruction of prohibiting (an instruction of setting locking on) operation of the fusion splicing unit 11 is received from the wireless information terminal 20 through the communication unit 13, the lock unit 15 of the fusion splicer 10 prohibits operation of the fusion splicing unit 11 (Step S37). Subsequently, the display unit 17 causes the monitor 6 to display that maintenance is necessary (Step S38).

In the fusion splicer 10 for optical fibers according to the present embodiment, the communication unit 13 is wirelessly connected to the wireless information terminal 20 that is an external terminal, and the setting unit 14 sets fusion conditions in accordance with information acquired by the communication unit 13 from the wireless information terminal 20. Accordingly, the wireless information terminal 20 provided at an installation place and the communication unit 13 perform communication with each other, so that fusion splicing can be performed under fusion conditions suitable for fusion work within a range in which communication can be performed with the wireless information terminal 20.

In general, the kind of installed optical fibers varies in accordance with an installation place. Accordingly, fusion conditions suitable for fusion splicing also varies in accordance with an installation place. According to the fusion splicer 10, fusion splicing under suitable fusion conditions can be easily performed in accordance with the wireless information terminal 20 within a range in which the wireless information terminal 20 can communicate. Consequently, suitable fusion conditions can be easily set in accordance with the kind of optical fibers or the like by causing the range in which the wireless information terminal 20 can communicate to correspond to the installation place. Fusion conditions suitable for each area can be easily set by disposing the plurality of wireless information terminals 20 in areas having optical fibers differing from each other in kind.

In the fusion splicer according to the present embodiment, the information related to the fusion conditions is set in accordance with the position of the fusion splicer 10. In other words, the information related to the fusion conditions is set in accordance with the area allocated to the wireless information terminal 20. In this case, fusion splicing under suitable fusion conditions can be easily performed in accordance with an area.

In the fusion splicer according to the present embodiment, the information related to the fusion conditions includes at least one condition of the kind of optical fibers, the discharging intensity and the discharging time of arc discharging at the time of fusing optical fibers, the positions of tips of optical fibers, and the end surface angles of optical fibers. Thus, the fusion splicer 10 can fusion splice optical fibers more suitably.

In the fusion splicer according to the present embodiment, the lock unit 15 allows and prohibits operation of the fusion splicing unit 11 in accordance with communication between the communication unit 13 and the wireless information terminal 20. The lock unit 15 allows operation of the fusion splicer 10 based on a release signal received by the communication unit 13 from the wireless information terminal 20. Thus, the fusion splicer 10 can be managed from the outside, and unsuitable fusion splicing can be prevented.

In the fusion splicer according to the present embodiment, when the communication unit 13 establishes wireless communication with the wireless information terminal 20, the lock unit 15 allows operation of the fusion splicing unit 11. For example, when the fusion splicer 10 establishes wireless connection in a state of being locked to prevent theft, the fusion splicer can be allowed to be used. Thus, both countermeasures for preventing theft and improvement of convenience can be achieved.

In the fusion splicer according to the present embodiment, the communication unit 13 transmits the fusion state data prepared by the data preparation unit 16 to the wireless information terminal 20. Accordingly, the fusion state data can be managed, and the fusion splicer 10 can also be instructed based on the fusion state data. For example, when the determination unit 34 of the server 30 determines that the state of the fusion splicer 10 is poor based on the fusion state data, operation of the fusion splicer 10 can be prohibited.

In the wireless information terminal according to the present embodiment, it is detected that the fusion splicer 10 is positioned within a range in which the communication unit 21 wirelessly connected to the fusion splicer 10 can communicate. The communication unit 21 transmits the information related to the fusion conditions used for fusion splicing to the fusion splicer 10 detected by the detection unit 22. Thus, within a range in which the wireless information terminal 20 provided at an installation place can communicate, information related to suitable fusion conditions can be transmitted to the fusion splicer 10 in accordance with the range in which the communication can be performed. Therefore, suitable fusion conditions can be easily set in accordance with the kind of optical fibers or the like by causing the range in which the wireless information terminal 20 can communicate to correspond to the installation place.

In the fusion splicing system according to the present embodiment, the determination unit 34 determines whether operation of the fusion splicer 10 is prohibited based on the fusion state data. When the determination unit 34 determines that operation of the fusion splicer 10 is prohibited, the communication unit 21 of the wireless information terminal 20 transmits an instruction signal for prohibiting operation of fusion splicing by the fusion splicer 10 to the fusion splicer 10. Thus, when optical fibers are not fusion spliced suitably based on the fusion state data, operation of the fusion splicer 10 can be prohibited.

The fusion splicer, the wireless information terminal, and the fusion splicing system according to the present embodiment have been described. However, the fusion splicer, the wireless information terminal, and the fusion splicing system according to the present invention are not limited to the foregoing embodiments, and various modifications can be applied thereto.

For example, the fusion splicer 10 may communicate simultaneously with a plurality of wireless information terminals 20. In this case, for example, a wireless information terminal 20 for communicating wirelessly with may be decided in accordance with the position of the fusion splicer 10 determined by the GPS 10h of the fusion splicer 10.

Wireless communication between the communication unit 13 of the fusion splicer 10 and the communication unit 21 of the wireless information terminal 20 is not limited to that in the foregoing embodiments. For example, wireless communication therebetween may be performed through a wireless LAN, the Bluetooth (registered trademark), visible light communication, radio frequency identification (RFID), or the like.

The communication unit 13 of the fusion splicer 10 may directly communicate with the communication unit 31 of the server 30 without having the communication unit 21 of the wireless information terminal 20 therebetween.

REFERENCE SIGNS LIST

1 Fusion splicing system
3b Discharging electrode
10 Fusion splicer
11 Fusion splicing unit
13, 21 Communication unit
14 Setting unit
15 Lock unit
16 Data preparation unit
22 Detection unit
25 Acquisition unit
34 Determination unit

The invention claimed is:

1. A fusion splicer comprising:
a fusion splicing unit that fusion splices optical fibers; and
a computer programmed to set a lock unit that prohibits operation of the fusion splicing unit;

communicate through a wireless connection with an external terminal;

transmit identification information of the fusion splicer to the external terminal;

receive a release signal from the external terminal;

release the lock unit in response to receiving the release signal, thereby allowing operation of the fusion splicer;

acquire information related to a fusion condition of the fusion splicing unit from the external terminal based on the identification information;

set the fusion condition of the fusion splicing unit based on the acquired information related to the fusion condition; and control the fusion splicing unit to fusion splice in accordance with the set fusion condition.

2. The fusion splicer according to claim 1, wherein the information related to the fusion condition is set in accordance with (i) a position of the fusion splicer, and (ii) an area allocated to the external terminal.

3. The fusion splicer according to claim 1, wherein the fusion splicing unit has a pair of discharging electrodes to fuse tips of the optical fibers by arc discharging, and wherein the information related to the fusion condition includes at least one condition of a kind of the optical fibers, a discharging intensity of the arc discharging at a time of fusing the optical fibers, a discharging time thereof, positions of the tips of the optical fibers, and end surface angles of the optical fibers.

4. The fusion splicer according to claim 1, wherein the lock unit allows operation of the fusion splicing unit when the computer establishes wireless communication with the external terminal.

5. The fusion splicer according to claim 1, wherein the computer is further programmed to prepare fusion state data indicating a fusion state of the optical fibers fusion spliced by the fusion splicing unit, and the computer transmits the prepared fusion state data to the external terminal.

6. The fusion splicer according to claim 1, wherein the computer is programmed to acquire the information related to the fusion condition from the external terminal based on the identification information being determined to be allowed by the external terminal.

7. A wireless information terminal comprising:

a computer programed to communicate through a wireless connection with a fusion splicer that (i) fusion splices optical fibers and (ii) has identification information of the fusion splicer for the wireless connection;

detect that the fusion splicer is positioned within a range in which the computer communicates by using the identification information of the fusion splicer;

determine whether operation of the fusion splicer having the identification information is allowed in an area by using the identification information of the fusion splicer;

transmit a release signal configured to instruct the detected fusion splicer to release locking of the operation of the fusion splicer, to the fusion splicer, when it is determined that the operation of the fusion splicer is allowed in the area;

acquire information related to a fusion condition used for the fusion splicing; and transmit the information related to the fusion condition to the detected fusion splicer.

8. The wireless information terminal according to claim 7, wherein the area is allocated to the wireless information terminal, and the information related to the fusion condition is set in accordance with the area.

9. The wireless information terminal according to claim 7, wherein the information related to the fusion condition includes at least one condition of a kind of the optical fibers, a discharging intensity of arc discharging at a time of fusing the optical fibers, a discharging time thereof, positions of tips of the optical fibers, and end surface angles of the optical fibers.

10. A fusion splicing system comprising:

a server including a database defining relationships between operation information and identification information of a plurality of fusion splicers, the operation information including information related to a fusion condition for fusion splicing;

a first fusion splicer of the plurality of fusion splicers configured to fusion splice optical fibers, the first fusion splicer including a first computer programed to communicate with the outside through a wireless connection; and a wireless information terminal including a second computer programed to (i) communicate through the wireless connection with the first computer and (ii) acquire the information related to the fusion condition from the server, wherein the first computer is further programed to acquire the information related to the fusion condition acquired by the second computer through wireless communication between the first computer and the second computer, and the first fusion splicer is configured to execute fusion splicing in accordance with the fusion condition based on the acquired information related to the fusion condition.

11. The fusion splicing system according to claim 10, wherein the information related to the fusion condition is set in accordance with an area allocated to the wireless information terminal.

12. The fusion splicing system according to claim 10, wherein the first fusion splicer includes a pair of discharging electrodes to fuse tips of the optical fibers by arc discharging, and wherein the information related to the fusion condition includes at least one condition of a kind of the optical fibers, a discharging intensity of the arc discharging at a time of fusing the optical fibers, a discharging time thereof, positions of the tips of the optical fibers, and end surface angles of the optical fibers.

13. The fusion splicing system according to claim 10, wherein the first computer is programed to allow operation of fusion splicing when the wireless connection between the first computer and the second computer is established.

14. The fusion splicing system according to claim 10, wherein the second computer is further programed to determine whether operation of the first fusion splicer is prohibited, wherein the first computer is further programed to prepare fusion state data indicating a fusion state of the optical fibers, the second computer is further programed to determine whether operation of the first fusion splicer is prohibited based on the fusion state data, and the second computer is further programed to transmit an instruction signal to prohibit operation of fusion splicing by the first fusion splicer to the first computer when the second computer determines that operation of the first fusion splicer is prohibited.

15. A method for fusion splicing optical fibers in a fusion splicing system including (a) a server including a database defining relationships between operation information and identification information of a plurality of fusion splicers, the operation information including information related to a fusion condition for fusion splicing, (b) a first fusion splicer of the plurality of fusion splicers including a first computer wirelessly connected to the outside and programed to fusion splice optical fibers, and (c) a wireless information terminal including a second computer wirelessly connected to the first fusion splicer and programed to acquire the information related to the fusion condition from the server, the method comprising:

acquiring the information related to the fusion condition from the server by the second computer and wirelessly transmitting the information related to the fusion splicing to the first computer by the second computer; and acquiring the information related to the fusion condition wirelessly transmitted from the second computer by the fusion splicer, and executing fusion splicing in accordance with the fusion condition based on the acquired information related to the fusion condition by the fusion splicer.

* * * * *